US012753617B2

(12) United States Patent
Li et al.

(10) Patent No.: US 12,753,617 B2
(45) Date of Patent: Oct. 6, 2026

(54) BUS BAY WITH VARIABLE BERTHS AND OPERATION METHOD THEREFOR

(71) Applicant: Hohai University, Nanjing (CN)

(72) Inventors: Rui Li, Nanjing (CN); Zhe Chen, Yancheng (CN); Qian Cheng, Dandong (CN)

(73) Assignee: HOHAI UNIVERSITY, Nanjing (CN)

( * ) Notice: Subject to any disclaimer, the term of this patent is extended or adjusted under 35 U.S.C. 154(b) by 524 days.

(21) Appl. No.: 18/528,800

(22) Filed: Dec. 5, 2023

(65) Prior Publication Data

US 2024/0410192 A1 Dec. 12, 2024

(30) Foreign Application Priority Data

Jun. 6, 2023 (CN) ......................... 202310662668.1

(51) Int. Cl.

| | |
|---|---|
| ***E04H 1/12*** | (2006.01) |
| ***G08G 1/09*** | (2006.01) |
| ***G08G 1/097*** | (2006.01) |
| ***G08G 1/123*** | (2006.01) |

(52) U.S. Cl.

CPC ............. *E04H 1/1211* (2013.01); *G08G 1/09* (2013.01); *G08G 1/097* (2013.01); *G08G 1/123* (2013.01)

(58) Field of Classification Search

CPC ... E01C 1/002; E04H 1/1211; G01C 21/3461; G01C 21/3476; G01C 21/3492; G01C 21/3691; G08G 1/09; G08G 1/097; G08G 1/123

See application file for complete search history.

(56) References Cited

U.S. PATENT DOCUMENTS 11,682,301 B2 * 6/2023 Lee ........................ G08G 1/123 340/994

FOREIGN PATENT DOCUMENTS

| | | | | |
|---|---|---|---|---|
| CN | 107978169 A | * | 5/2018 | G06F 16/29 |
| CN | 111998866 B | * | 8/2022 | G01C 21/343 |
| CN | 115631647 A | * | 1/2023 | G08G 1/123 |
| CN | 115223362 B | * | 2/2024 | G08G 1/0137 |
| KR | 101489808 B1 | * | 2/2015 | E04H 1/1211 |

* cited by examiner

*Primary Examiner* — Gary S Hartmann

(57) ABSTRACT

A bus bay with variable berths and an operation method therefor include: a bus stop with multiple fixed berths, a variable berth module, an in-station detection module, an off-station detection module, a motorway, and green belts; the bus stop, the variable berth module, the in-station detection module, and the off-station detection module are sequentially disposed side by side on a side of the motorway. The variable berth module includes an alternative berth and an alternative waiting area, which are surrounded by multiple sets of lifting columns; the in-station detection module and the off-station detection module are disposed in the green belts; a warning sign is fixed on a pole as belonging to the off-station detection module; the in-station detection module includes a control sub-module therein, the variable berth module, the in-station detection module, and the off-station detection module are connected with the control sub-module.

8 Claims, 6 Drawing Sheets

BUS BAY WITH VARIABLE BERTHS AND OPERATION METHOD THEREFOR

TECHNICAL FIELD

The disclosure relates to the field of bus stop operation control, particularly to a bus bay with variable berths and an operation method therefor.

BACKGROUND

In recent years, with an accelerating process of urbanization and motorization in China, urban traffic congestion problems have been increasingly serious, and have become a major problem restricting urban development. Vigorously developing public transportation and accelerating urban public transportation construction are important means of solving the urban traffic congestion problems.

However, there often occurs a phenomenon of "queue overflow" during the operation of public transportation vehicles. At a bus stop, it is easy to encounter a situation where the number of buses exceeds the number of berths at the bus stop. Therefore, later arriving buses will occupy an access road, queuing up outside the berths for waiting to enter the bus stop (causing the phenomenon of "queuing overflow" of the buses at the bus stop), which affects a normal access of other vehicles. Due to constraints of road resources, it also cannot set up too much of the bus berths at the bus stop to cope with the "queuing overflow" of the buses at the bus stop.

Therefore, there is a need to design a bus stop with variable berths, and dynamically regulate the berths according to the arrival of the buses, thereby improving road utility, reducing an impact of bus queuing outside the bus stop on traffic flow of the road, and further improving road capacity.

SUMMARY

An objective of the disclosure is to provide a bus bay with variable berths and an operation method therefor to solve the problems existed in the related art.

In an aspect, the disclosure provides a bus bay with variable berths to achieve the above objective, including: a bus stop with multiple fixed berths, a variable berth module, an in-station detection module, an off-station detection module, a motorway, and green belts; the bus stop, the variable berth module, the in-station detection module, and the off-station detection module are sequentially arranged side by side on a side of the motorway; and the green belts are disposed on another side of the motorway; the variable berth module includes an alternative berth and an alternative waiting area, which are surrounded by multiple sets of lifting columns; the in-station detection module and the off-station detection module are disposed in the green belts; a warning sign is fixed on a pole as belonging to the off-station detection module; and the in-station detection module includes a control sub-module therein, the variable berth module, the in-station detection module, and the off-station detection module are connected with the control sub-module.

In an embodiment, the multiple fixed berths are disposed in parallel on a side of the bus stop.

In an embodiment, the alternative waiting area is a rectangular alternative waiting area, the alternative berth is a parallelogram alternative berth, a side of the rectangular alternative waiting area is connected to a corresponding side of the parallelogram alternative berth through multiple separation lifting columns, and the rectangular alternative waiting area is disposed parallel and adjacent to the parallelogram alternative berth; and other three sides of the rectangular alternative waiting area are respectively provided with multiple alternative waiting area lifting columns, and other three sides of the parallelogram alternative berth are respectively provided with multiple alternative berth lifting columns.

In an embodiment, the in-station detection module further includes: another pole and an in-station detector; the another pole is fixed on ground disposed between the alternative berth and the motorway through multiple screws, the in-station detector is disposed at a top of the another pole, and the control sub-module is disposed below the in-station detector; the control sub-module includes: a controller, and a power supply disposed in the controller; and the controller is configure to control lifting of the multiple alternative berth lifting columns, the multiple alternative waiting area lifting columns, and the multiple separation lifting columns.

In an embodiment, the off-station detection module further includes: an off-station detector; and the pole is fixed on ground disposed in the green belts through multiple screws, the off-station detector is disposed at a top of the pole, and the warning sign is configured to warn slowdown and is disposed below the off-station detector.

In another aspect, the disclosure provides an operation method for the bus bay with variable berths to solve the above objective, including following steps:

obtaining a bus number data $N_e$ in a section ahead of the bus stop through the off-station detector; obtaining a stopped bus number data $N_s$ at the bus stop through the in-station detector; analyzing the bus number data $N_e$ and the stopped bus number data $N_s$ to obtain an analysis result; developing a control plan for the variable berth module based on the analysis result; and controlling the variable berth module through the controller based on the control plan.

In an embodiment, the developing a control plan for the variable berth module based on the analysis result includes the following steps:

obtaining a number $B_f$ of the multiple fixed berths of the bus stop; obtaining an opened alternative berth number $B_o$ based on the stopped bus number data $N_s$;

when $N_e+N_s<B_f+B_o$, the control plan is as follows:

$n_c=B_f+B_o-N_e-N_s$, where $n_c$ represents a number of alternative berth and corresponding alternative waiting area to be closed; or when $N_e+N_s=B_f+B_v$, the control plan is as follows:

keeping the variable berth module unchanged; or when $B_f+B_o<N_e+N_s<B_f+B_v$, the control plan is as follows:

$n_o=N_e+N_s-B_f-B_o$, where $B_v$ represents a total number of the alternative berth of the variable berth module, $n_o$ represents a number of alternative berth and corresponding alternative waiting area to be opened; or when $N_e+N_s>B_f+B_v$, the control plan is as follows:

opening all the alternative berth in the variable berth module through the controller.

In an embodiment, in the controlling the variable berth module through the controller, when the alternative berth is opened, the controller descends the multiple alternative berth lifting columns and the multiple separation lifting columns to a height same as the ground, and the controller lifts the multiple alternative waiting area lifting columns from the ground; or when the alternative berth is closed, the controller lifts the multiple alternative berth lifting columns and the multiple separation lifting columns from the ground, and the controller descends the multiple alternative waiting area lifting columns to a height same as the ground; and when a number of the alternative berth is more than one, the alternative berths are opened one by one from a downstream to an upstream of the alternative berths, and the alternative berths are closed one by one from the upstream to the downstream of the alternative berths.

Beneficial effects of the disclosure are as follows:

The disclosure provides the bus bay with variable berths and the operation method therefor, including the bus stop with the multiple fixed berths, the variable berth module, the in-station detection module, the off-station detection module, the motorway, and the green belts; the bus stop, the variable berth module, the in-station detection module, and the off-station detection module are sequentially arranged side by side on the side of the motorway; the green belts are disposed on another side of the motorway; the variable berth module includes the alternative berth and the alternative waiting area, which are surrounded by the multiple sets of lifting columns; the in-station detection module and the off-station detection module are disposed in the green belts; the warning sign is fixed on the pole as belonging to the off-station detection module; and the in-station detection module includes the control sub-module therein, the variable berth module, the in-station detection module, and the off-station detection module are connected with the control sub-module.

The alternative berths in the disclosure can be dynamically regulated according to the arrival of the buses, avoiding the occurrence of "queuing overflow" of the buses at the bus stop, improving the traffic efficiency of the motorway, and promoting the utility of the bus stop.

When the alternative waiting area of the disclosure is closed, it can be used for running non-motorized vehicles, thereby improving the utility of non-motorway and achieving high utility.

The warning sign of the disclosure can warn the non-motorized vehicles, thereby ensuring their safe cycling and high public safety.

BRIEF DESCRIPTION OF DRAWINGS

In order to illustrate embodiments of the disclosure or technical solution in the related art more clearly, attached drawings required in the embodiments are briefly described. Apparently, the attached drawings in the following description are only some of the embodiments of the disclosure. For those skilled in the related art, other attached drawings can also be obtained based on the attached drawings of the disclosure without any creative effort.

The attached drawings forming a part of the disclosure are used to facilitate a further understanding for the disclosure. The illustrated embodiments and their corresponding explanations are used to explain the disclosure and do not constitute an improper limitation to the disclosure.

DESCRIPTION OF REFERENCE NUMERALS

Figure 1:
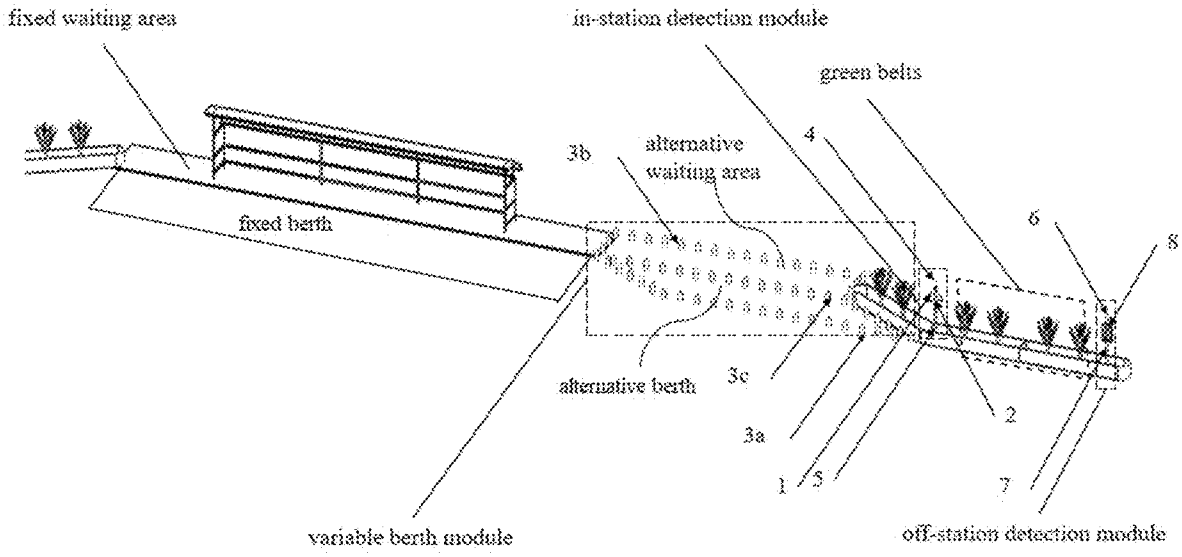
FIG. 1 illustrates a three-dimensional schematic diagram of a bus bay with variable berths according to an embodiment the disclosure.

1—controller; 2—power supply; 3—lifting column; 3*a*—alternative berth lifting column; 3*b*—alternative waiting area lifting column; 3*c*—separation lifting column; 4—in-station detector; 5—first pole; 6—off-station detector; 7—second pole; 8—warning sign.

DETAILED DESCRIPTION OF EMBODIMENTS

The various illustrated embodiments of the disclosure are now explained in detail, which should not be considered as a limitation to the disclosure, but should be understood as a more detailed description of certain aspects, features, and implementation schemes of the disclosure.

It should be understood that terms described in the disclosure are only intended to describe the illustrated embodiments and are not intended to limit the disclosure. Each smaller range within any stated value or an intermediate value within the stated range, and any other stated value or an intermediate value within the other stated range, is also included in the disclosure. An upper limit and a lower limit of the smaller range can be independently included or excluded from the range.

Unless otherwise stated, all of technical and scientific terms used herein have the same meanings as those commonly understood by those skilled in the related art described in the disclosure. Although the disclosure only describes the illustrated implementation mode, other implementation modes similar or equivalent to that described herein can also be used in the embodiments or testing of the disclosure. All of literature mentioned in the specification is incorporated by reference to disclose and describe methods related to the literature. When the disclosure is conflict with any incorporated literature, the content of the specification of the disclosure prevails.

Without departing from the scope or spirit of the disclosure, it is evident to those skilled in the related art that various improvements and variations can be made to the illustrated embodiments described in the specification of the disclosure. The other embodiments obtained from the specification of the disclosure are apparent to those skilled. The specification and the embodiments described in the disclosure are only illustrative.

The terms “containing”, “including”, “possessing”, “having”, and so on used herein are open terms, meaning including but not limited to.

It should be noted that in the absence of conflicts, the embodiments and the features in the embodiments in the disclosure can be combined with each other. The disclosure will be explained in detail below with reference to the attached drawings and in conjunction with the embodiments.

As shown in FIGS. 1-9, an embodiment of the disclosure provides a bus bay with variable berths and an operation method therefor; the bus bay with variable berths includes: a bus stop with multiple fixed berths, a variable berth module, an in-station detection module, an off-station detection module, a motorway, and green belts; the bus stop, the variable berth module, the in-station detection module, and the off-station detection module are sequentially arranged side by side on a side of the motorway; the green belts are disposed on another side of the motorway; the variable berth module includes an alternative berth and an alternative waiting area, which are surrounded by multiple sets of lifting columns; the in-station detection module and the off-station detection module are disposed in the green belts; a warning sign 8 is fixed on a second pole 7 (also referred to as a pole of the off-station detection module) as belonging to the off-station detection module; and the in-station detection module includes a control sub-module therein, the variable berth module, the in-station detection module, and the off-station detection module are connected with the control sub-module.

Figure 2:
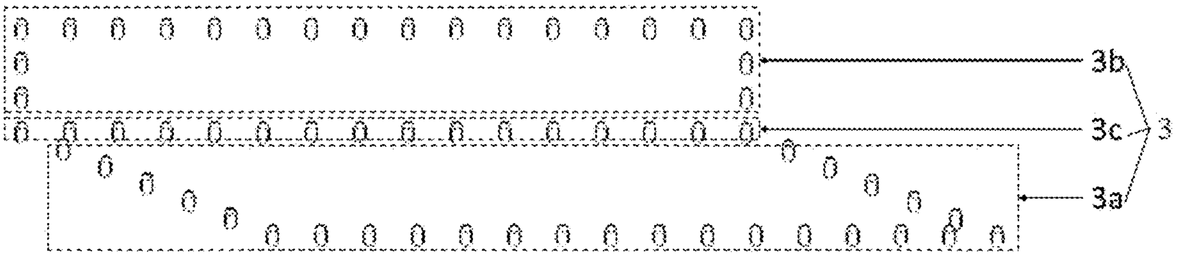
FIG. 2 illustrates a three-dimensional schematic structural diagram of a variable berth module according to the embodiment of the disclosure.
Figure 3:
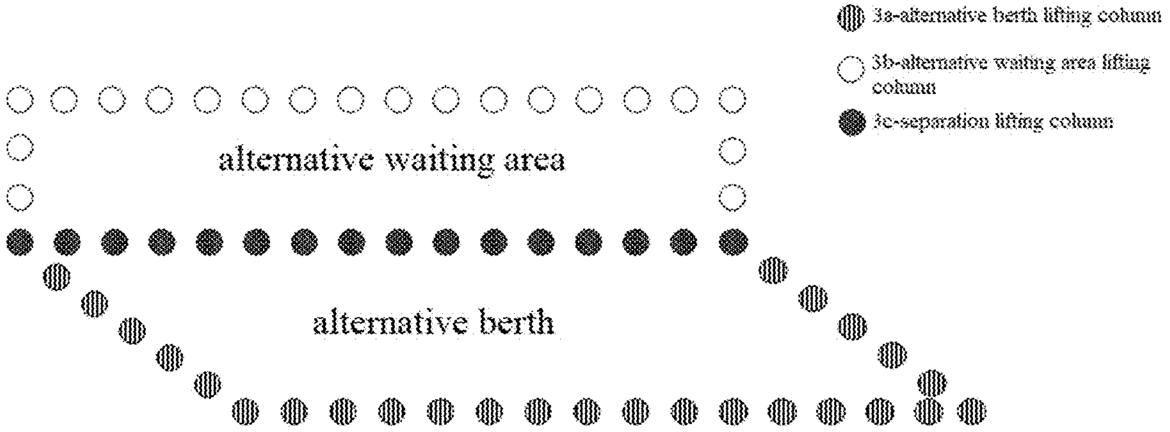
FIG. 3 illustrates a schematic top view of the variable berth module according to the embodiment of the disclosure.
Figure 4:
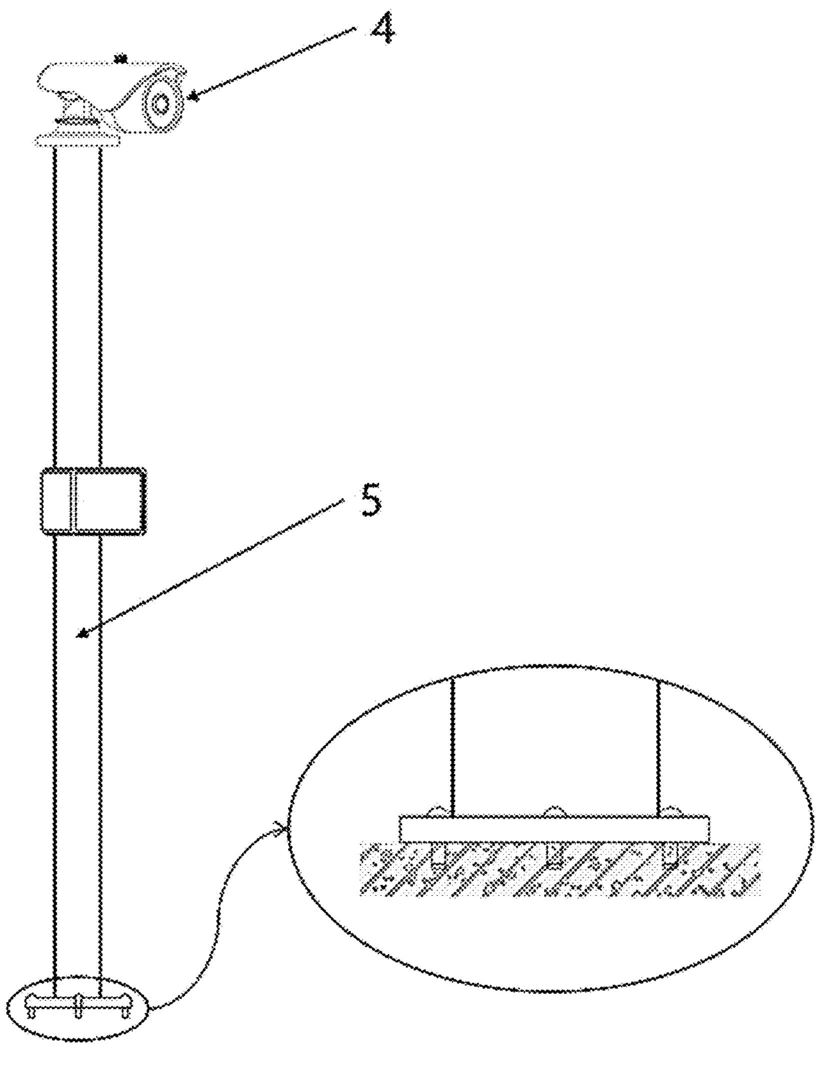
FIG. 4 illustrates a three-dimensional schematic diagram of an in-station detection module according to the embodiment of the disclosure.
Figure 5:
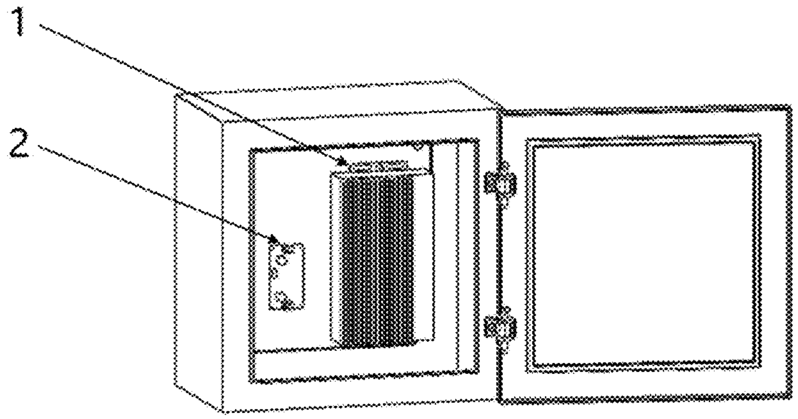
FIG. 5 illustrates a three-dimensional schematic diagram of a control sub-module according to the embodiment of the disclosure.
Figure 6:
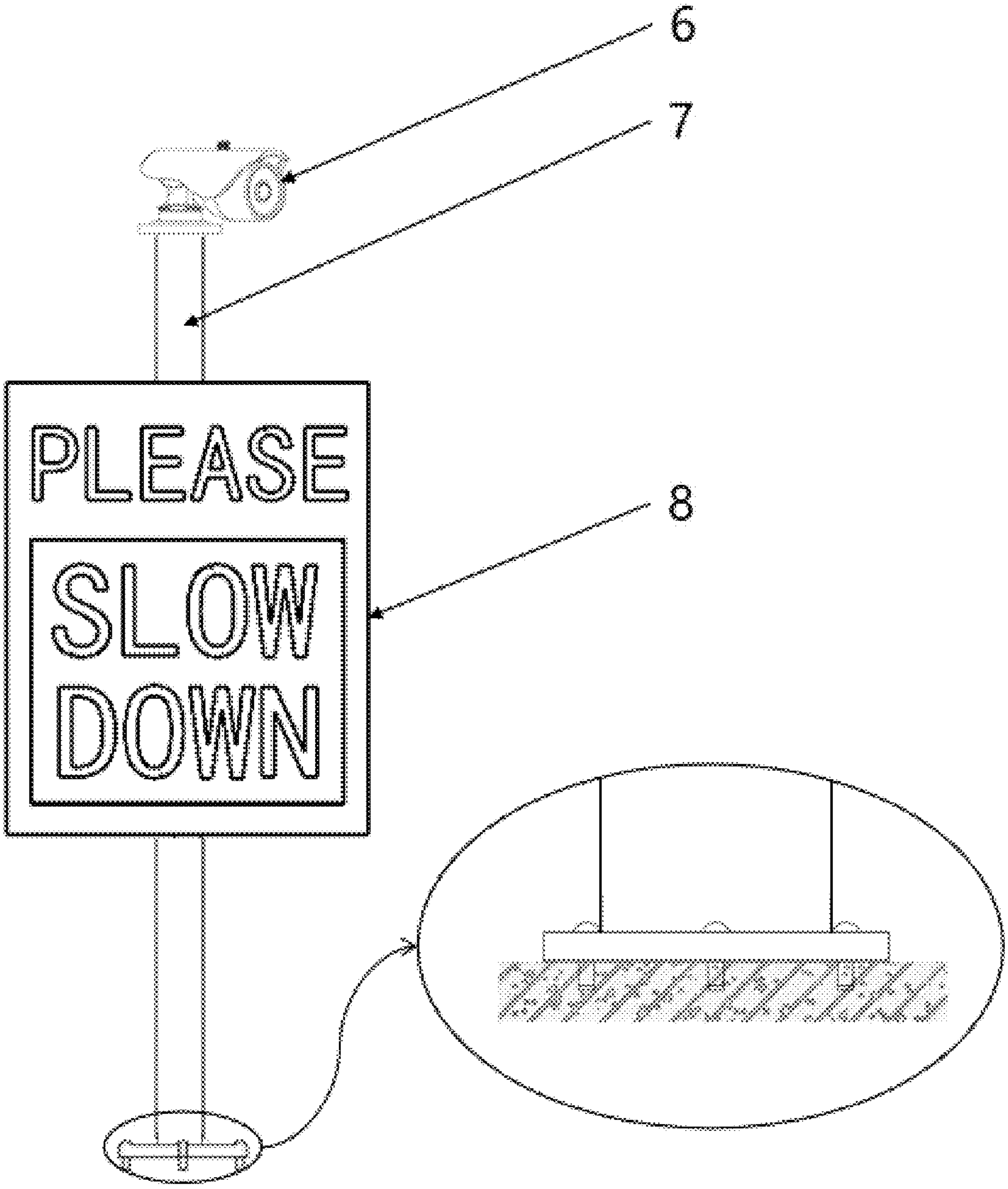
FIG. 6 illustrates a three-dimensional schematic diagram of an off-station detection module according to the embodiment of the disclosure.
Figure 7:
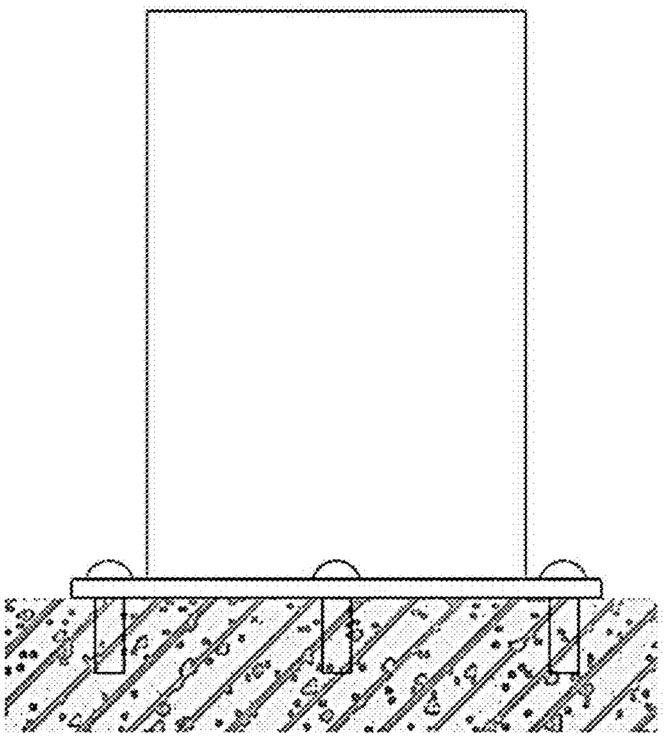
FIG. 7 illustrates a schematic front view of multiple sets of lifting columns according to the embodiment of the disclosure.

As shown in FIG. 5, the control sub-module includes a controller 1 and a power supply 2. The control sub-module is installed on a first pole 5 (also referred to as another pole) of the in-station detection module. The controller 1 controls each module, and the power supply 2 supplies power to each module. As shown in FIG. 2, the variable berth module includes an alternative berth, an alternative waiting area, and multiple sets of lifting columns 3. The alternative berth and the alternative waiting area are surrounded by the multiple sets of lifting columns 3, which are all connected to the controller 1 through a wireless network. The multiple sets of lifting columns 3 include multiple alternative berth lifting columns 3*a*, multiple alternative waiting area lifting columns 3*b*, and multiple separation lifting columns 3*c*, all of which are controlled by the controller 1 during a lifting process. As shown in FIG. 4, the in-station detection module includes an in-station detector 4 and the first pole 5. The in-station detector 4 is installed at a top of the first pole 5 and wirelessly connected to the controller 1. The first pole 5 is anchored to ground disposed in the corresponding alternative berth. As shown in FIG. 6, the off-station detection module further includes an off-station detector 6. The off-station detector 6 is installed at a top of the second pole 7 and wirelessly connected to the controller 1. The warning sign 8 is installed on the second pole 7 of the off-station detection module and wirelessly connected to the controller 1. The second pole 7 is anchored to ground that is disposed in an upstream of the in-station detection module.

The control sub-module is installed on the first pole 5 of the in-station detection module, with a height of 1,300 millimeters (mm) to 1,600 mm away from the ground. The controller 1 is connected to each module through the wireless network, and the power supply 2 supplies the power to each module through wires with a voltage of 110 volts (V) to 240V.

In an illustrated embodiment, a width of the alternative berth in the variable berth module is consistent with that of the fixed berth in the bus stop, a length of the alternative berth is 15 meters (m) to 20 m, and the number of the alternative berth is determined according to needs. A width of the alternative waiting area is consistent with that of a fixed waiting area in the bus stop, and a length of the alternative waiting area is consistent with that of the alternative berth. The multiple sets of lifting columns 3 includes multiple alternative berth lifting columns 3*a*, multiple alternative waiting area lifting columns 3*b*, and multiple separation lifting columns 3*c*. The lifting process is controlled by the controller 1. The multiple separation lifting columns 3*c* separate the alternative berth from the corresponding alternative waiting area, and the multiple alternative berth lifting columns 3*a* and the multiple alternative waiting area lifting columns 3*b* are evenly anchored to a periphery of the alternative berth and the alternative waiting area respectively (also referred to another three sides of the alternative berth and the alternative waiting area, respectively). A height of each of the multiple sets of lifting columns 3 is 400 mm to 600 mm, a diameter of each of the lifting columns 3 is 150 mm to 250 mm, and spacing between two of the multiple sets of lifting columns 3 is 800 mm to 1,500 mm.

In an illustrated embodiment, a height of the first pole 5 of the in-station detection module is 3.5 m to 5 m, and the first pole 5 is anchored to the ground at the alternative berth that is located at a farthest upstream away from the bus stop. The in-station detector 4 is installed on the top of the first pole 5 to detect occupancy of the multiple fixed berths in the bus stop and transmit real-time data to the controller 1.

In an illustrated embodiment, the second pole 7 of the off-station detection module has a height of 3.5 m to 5 m and is anchored to the ground at a distance of 150 m to 200 m upstream of the in-station detection module. The off-station detector 6 is installed at the top of the second pole 7, identifying the buses passing through a cross-section of the off-station detection module and detecting the number of buses in a section ahead of the bus stop, and then transmitting the data in real-time to the controller 1. The warning sign 8 is installed on the second pole 7 to warn non-motorized vehicles that ahead of the non-motorway is narrowing, with a height of 1,600 millimeters (mm) to 2,200 mm away from the ground.

The off-station detector 6 can recognize the passing buses and detect the number of buses in the section ahead of the bus stop, sending information data to the controller 1. Simultaneously, the in-station detector 4 is triggered to detect the number of stopped buses at the bus stop and send information data to the controller 1. The controller 1 then converts the information data into input/output (I/O) signals and transmits them to the lifting columns 3.

As shown in FIG. 1, in an illustrated embodiment, the disclosure includes two fixed berths (i.e., a first fixed berth and a second fixed berth) and one alternative berth. A width of each of the first fixed berth and the second fixed berth is 3,000 mm, and a length of each of the first fixed berth and the second fixed berth is 15,000 mm. The fixed waiting area is disposed between the two fixed berths and the non-motorway. In an illustrated embodiment, there are two fixed waiting areas (i.e., a first fixed waiting area and a second fixed waiting area). A width of each of the first fixed waiting area and the second fixed waiting area is 3,000 mm, a length of each of the first fixed waiting area and the second fixed waiting area is 15,000 mm, and a height of each of the first fixed waiting area and the second fixed waiting area is 200 mm.

As shown in FIG. 4, in an illustrated embodiment, the control sub-module is installed on an outer surface of the first pole 5, at a height of 1,500 mm away from the ground. The control sub-module includes a control box, which is internally equipped with the controller 1 and the power supply 2. The controller 1 controls each module, and the power supply 2 supplies power to each module with a voltage of 110V to 240V.

As shown in FIG. 2, in an illustrated embodiment, the variable berth module is located at the upstream of the multiple fixed berths, especially there is one alternative berth and one alternative waiting area; and the peripheries of the alternative berth and the alternative waiting area are equipped with the multiple sets of lifting columns 3. The parameters of each lifting column 3 in the embodiment are: height of 400 mm, diameter of 200 mm, and the spacing between two columns of 1000 mm. The multiple alternative berth lifting columns 3*a* and the multiple separation lifting columns 3*c* together enclose a parallelogram alternative berth, with a length of 15,000 mm and a width of 6,000 mm, and an angle between the length and the width of the parallelogram alternative berth is an acute angle of 30°. The multiple separation lifting columns 3*c* and the multiple alternative waiting area lifting columns 3*b* together enclose a rectangular alternative waiting area, with a length of 15,000 mm and a width of 3,000 mm. After opening the alternative berth, the multiple alternative berth lifting columns 3*a* and the multiple separation lifting columns 3*c* slowly descend to the same height as the ground, and the multiple alternative waiting area lifting columns 3*b* slowly lift until they are above the ground. After closing the alternative berth, the multiple alternative berth lifting columns 3*a* and the multiple separation lifting columns 3*c* slowly lift until they are above the ground, and the multiple alternative waiting area lifting columns 3*b* slowly descend to the same height as the ground.

In an embodiment, the in-station detection module is disposed in the alternative berth, and the first pole 5 is anchored to the ground between the alternative berth and the motorway, with a height of 4,000 mm and a diameter of 80 mm. The top of the first pole 5 is equipped with the in-station detector 4.

In an illustrated embodiment, the off-station detection module is located at the ground in the 150 m to 200 m upstream of the in-station detection module, and the second pole 7 is anchored to the ground between the green belts and the motorway, with a height of 4,000 mm and a diameter of 80 mm. The top of the second pole 7 is equipped with the off-station detector 6.

In an illustrated embodiment, the warning sign 8 is installed on the second pole 7 of the off-station detection module, with a height of 2,000 mm.

When the off-station detection module detects buses passing, each module begins to operate. The off-station detector 6 detects a bus number data $N_e$ in the section ahead of the bus stop. The in-station detector 4 detects a stopped bus number data $N_s$ at the bus stop. And the real-time bus information is transmitted to the controller 1.

An open state of the alternative berth is as follows: the multiple alternative berth lifting columns 3*a* and the multiple separation lifting columns 3*c* are lower than the ground, and the multiple alternative waiting area lifting columns 3*b* are higher than the ground. A closed state of the alternative berth is as follows: the multiple alternative berth lifting columns 3*a* and the multiple separation lifting columns 3*c* are higher than the ground, and the multiple alternative waiting area lifting columns 3*b* are lower than the ground.

Figure 8:
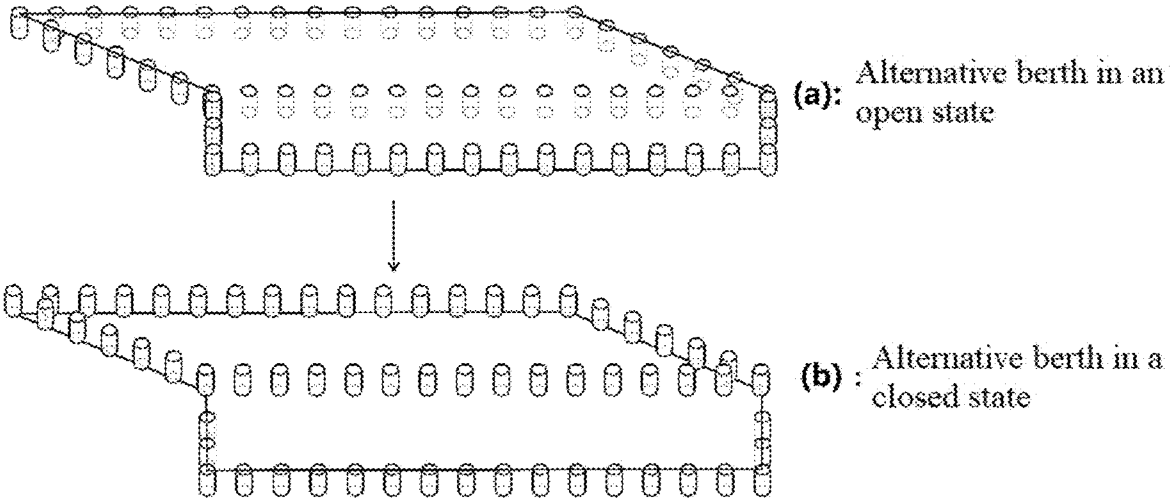
FIG. 8 illustrates a three-dimensional schematic diagram of a process of closing an alternative berth in the variable berth module according to the embodiment of the disclosure; in which the figure (a) illustrates a three-dimensional schematic diagram of the alternative berth of the variable berth module in an open state according to the embodiment of the disclosure; and the figure (b) illustrates a three-dimensional schematic diagram of the alternative berth of the variable berth module in a closed state according to the embodiment of the disclosure.

When $N_e+N_s=1$, if the alternative berth is in the open state at this time, the alternative berth should be closed. As shown in FIG. 8, the controller 1 lifts the multiple alternative berth lifting columns 3*a* and the multiple separation lifting columns 3*c* from the ground, and the controller 1 descends the multiple alternative waiting area lifting columns 3*b* to the same height as the ground. If the alternative berth is in the closed state at this time, it remains unchanged, as shown in figure (b) of FIG. 8.

When $N_e+N_s=2$, if the alternative berth is in the open state at this time, the alternative berth should be closed. As shown in FIG. 8, the controller 1 lifts the multiple alternative berth lifting columns 3*a* and the multiple separation lifting columns 3*c* from the ground, and the controller 1 descends the multiple alternative waiting area lifting columns 3*b* to the same height as the ground. If the alternative berth is in the closed state at this time, it remains unchanged, as shown in figure (b) of FIG. 8.

Figure 9:
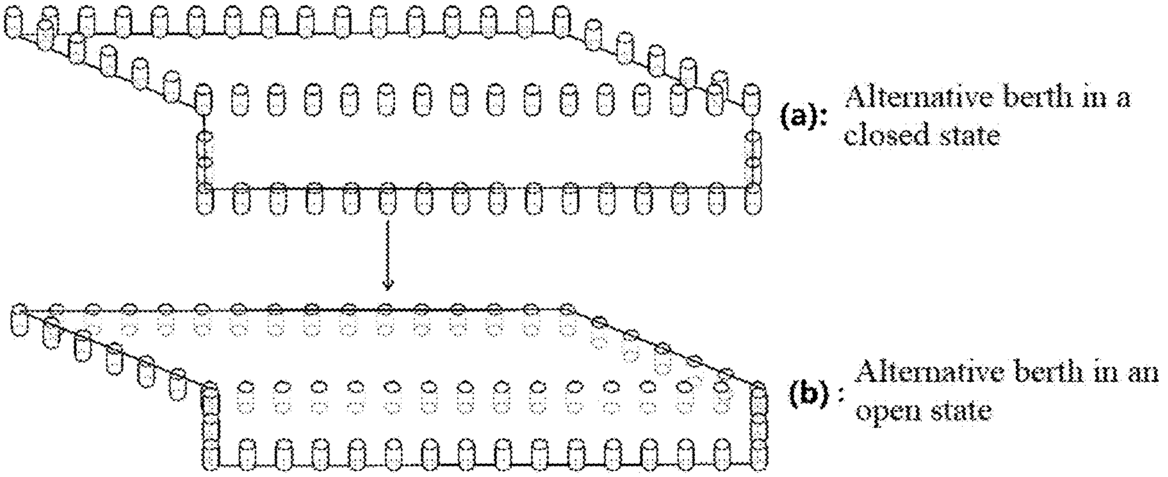
FIG. 9 illustrates a three-dimensional schematic diagram of a process of opening the alternative berth in the variable berth module according to the embodiment of the disclosure; in which the figure (a) illustrates a three-dimensional schematic diagram of the alternative berth of the variable berth module in a closed state according to the embodiment of the disclosure; and the figure (b) illustrates a three-dimensional schematic diagram of the alternative berth of the variable berth module in an open state according to the embodiment of the disclosure.

When $N_e+N_s \geq 3$, if the alternative berth is in the open state at this time, it remains unchanged, as shown in figure (b) of FIG. 9. If the alternative berth is in the closed state at this time, the alternative berth should be opened. As shown in FIG. 9, the controller 1 descends the multiple alternative berth lifting columns 3*a* and the multiple separation lifting columns 3*c* to the same height as the ground, and the controller 1 lifts the multiple alternative waiting area lifting columns 3*b* from the ground.

Controlling operation of the open state and the closed state of the alternative berth is as follows. When the alternative berth is opened, the controller 1 controls to descend the multiple alternative berth lifting columns 3*a* and the multiple separation lifting columns 3*c* to the same height as the ground, and the multiple alternative waiting area lifting columns 3*b* are controlled to lift from the ground. When the alternative berth is closed, the controller 1 lifts the multiple alternative berth lifting columns 3*a* and the multiple separation lifting columns 3*c* from the ground, and the multiple alternative waiting area lifting columns 3*b* are controlled to descend to the same height as the ground. When there is more than one alternative berth, the multiple alternative berths are opened one by one from a downstream to an upstream of the multiple alternative berths. And when the multiple alternative berths are closed, the multiple alternative berths are closed one by one from the upstream to the downstream of the alternative berths.

The above description is only the illustrated embodiments of the disclosure, but the scope of the protection of the disclosure is not limited to the above. Any changes or replacements that can be easily obtained by those skilled familiar with the related field under the description of the disclosure should be covered within the scope of the protection of the disclosure. Therefore, the scope of the protection of the disclosure should be based on the scope of the protection of the claims.

What is claimed is:

1. A bus bay with variable berths, comprising:

a bus stop with a plurality of fixed berths, a variable berth module, an in-station detection module, an off-station detection module, a motorway, and green belts;

wherein the bus stop, the variable berth module, the in-station detection module, and the off-station detection module are sequentially arranged side by side on a side of the motorway; and the green belts are disposed on another side of the motorway;

wherein the variable berth module comprises: an alternative berth and an alternative waiting area, and the alternative berth and the alternative waiting area are surrounded by a plurality of sets of lifting columns; the in-station detection module and the off-station detection module are disposed in the green belts; and a warning sign is fixed on a pole as belonging to the off-station detection module; and wherein the in-station detection module comprises: a control sub-module therein, and the variable berth module, the in-station detection module, and the off-station detection module are connected with the control sub-module.

2. The bus bay with variable berths as claimed in claim 1, wherein the plurality of fixed berths is disposed in parallel on a side of the bus stop.

3. The bus bay with variable berths as claimed in claim 1, wherein the alternative waiting area is a rectangular alternative waiting area, the alternative berth is a parallelogram alternative berth, a side of the rectangular alternative waiting area is connected to a corresponding side of the parallelogram alternative berth through a plurality of separation lifting columns, and the rectangular alternative waiting area is disposed parallel and adjacent to the parallelogram alternative berth; and wherein other three sides of the rectangular alternative waiting area are respectively provided with a plurality of alternative waiting area lifting columns, and other three sides of the parallelogram alternative berth are respectively provided with a plurality of alternative berth lifting columns.

4. The bus bay with variable berths as claimed in claim 3, wherein the in-station detection module further comprises: another pole and an in-station detector;

wherein the another pole is fixed on ground disposed between the alternative berth and the motorway through a plurality of screws, the in-station detector is disposed at a top of the another pole, and the control sub-module is disposed below the in-station detector;

wherein the control sub-module comprises: a controller, and a power supply disposed in the controller; and wherein the controller is configure to control lifting of the plurality of alternative berth lifting columns, the plurality of alternative waiting area lifting columns, and the plurality of separation lifting columns.

5. The bus bay with variable berths as claimed in claim 4, wherein the off-station detection module further comprises: an off-station detector; and wherein the pole is fixed on ground disposed in the green belts through a plurality of screws, the off-station detector is disposed at a top of the pole, and the warning sign is configured to warn slowdown and is disposed below the off-station detector.

6. An operation method for the bus bay with variable berths as claimed in claim 5, comprising: obtaining a bus number data $N_e$ in a section ahead of the bus stop through the off-station detector; obtaining a stopped bus number data $N_s$ at the bus stop through the in-station detector; analyzing the bus number data $N_e$ and the stopped bus number data $N_s$ to obtain an analysis result; developing a control plan for the variable berth module based on the analysis result; and controlling the variable berth module through the controller based on the control plan.

7. The operation method as claimed in claim 6, wherein the developing a control plan for the variable berth module based on the analysis result comprises the following steps:

obtaining a number $B_f$ of the plurality of fixed berths of the bus stop; obtaining an opened alternative berth number $B_o$ based on the stopped bus number data $N_s$;

wherein when $N_e+N_s<B_f+B_o$, the control plan is as follows:

$n_c=B_f+B_o-N_e-N_s$, where $n_c$ represents a number of alternative berth and corresponding alternative waiting area to be closed; or wherein when $N_e+N_s=B_f+B_v$, the control plan is as follows:

keeping the variable berth module unchanged; or wherein when $B_f+B_o<N_e+N_s<B_f+B_v$, the control plan is as follows:

$n_o=N_e+N_s-B_f-B_o$, where $B_v$ represents a total number of the alternative berth of the variable berth module, $n_o$ represents a number of alternative berth and corresponding alternative waiting area to be opened; or wherein when $N_e+N_s>B_f+B_v$, the control plan is as follows:

opening all the alternative berth in the variable berth module through the controller.

8. The operation method as claimed in claim 7, wherein in the controlling the variable berth module through the controller, when the alternative berth is opened, the controller descends the plurality of alternative berth lifting columns and the plurality of separation lifting columns to a height same as the ground, and the controller lifts the plurality of alternative waiting area lifting columns from the ground; or when the alternative berth is closed, the controller lifts the plurality of alternative berth lifting columns and the plurality of separation lifting columns from the ground, and the controller descends the plurality of alternative waiting area lifting columns to a height same as the ground; and when a number of the alternative berth is more than one, the alternative berths are opened one by one from a downstream to an upstream of the alternative berths, and the alternative berths are closed one by one from the upstream to the downstream of the alternative berths.

* * * * *